US011909142B2

(12) United States Patent
Nakai

(10) Patent No.: US 11,909,142 B2
(45) Date of Patent: Feb. 20, 2024

(54) CONNECTOR HAVING SEAL MEMBER

(71) Applicant: SUMITOMO WIRING SYSTEMS, LTD., Mie (JP)

(72) Inventor: Kazuo Nakai, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 31 days.

(21) Appl. No.: 17/574,233

(22) Filed: Jan. 12, 2022

(65) Prior Publication Data

US 2022/0239032 A1 Jul. 28, 2022

(30) Foreign Application Priority Data

Jan. 25, 2021 (JP) ................................ 2021-009350

(51) Int. Cl.
*H01R 13/52* (2006.01)

(52) U.S. Cl.
CPC ................................ *H01R 13/521* (2013.01)

(58) Field of Classification Search
CPC ............................ H01R 13/521; H01R 13/52
See application file for complete search history.

(56) References Cited

U.S. PATENT DOCUMENTS 5,145,410 A * 9/1992 Maejima ........... H01R 13/5208 439/587
5,433,628 A * 7/1995 Sadaishi ........... H01R 13/5202 439/736
7,029,328 B1 * 4/2006 Mckenzie .......... H01R 13/5221 439/587
7,077,676 B2 * 7/2006 Matsumoto .......... H01R 13/521 439/271
7,101,217 B2 * 9/2006 Hayashi ............. H01R 13/6592 439/589
7,156,698 B2 * 1/2007 Yamashita ......... H01R 13/5208 439/587
8,128,431 B2 * 3/2012 Kato .................... H01R 13/521 439/271
8,608,508 B2 * 12/2013 Kataoka ............. H01R 13/5208 439/589
8,905,784 B2 * 12/2014 Perotto .............. H01R 13/5202 439/587
9,608,362 B2 * 3/2017 Jelak ..................... H01R 13/521
11,217,933 B2 * 1/2022 Aoki .................. H01R 13/5208
2003/0087551 A1 * 5/2003 Okayasu ............ H01R 13/4368 439/587
2004/0266270 A1 12/2004 Miyazaki
2011/0059659 A1 * 3/2011 Matsumoto .......... H01R 13/426 439/733.1
2011/0316372 A1 * 12/2011 Kobayashi ........... H01R 13/521 310/71

(Continued)

FOREIGN PATENT DOCUMENTS

JP 2002-190348 A 7/2002

*Primary Examiner* — Harshad C Patel
(74) *Attorney, Agent, or Firm* — Venjuris, P.C.

(57) ABSTRACT

A connector 10 is provided with a male terminal 40 including a tab 42, a housing 20 for supporting the male terminal 40, a sealing space 32 provided around the tab 42 in the housing 20, a sealing portion 90 to be accommodated into the sealing space 32 while contacting the tab 42, and a pressing portion 100 for setting the sealing portion 90 in a compressed state by being located in the sealing space 32.

1 Claim, 8 Drawing Sheets

(56) References Cited

U.S. PATENT DOCUMENTS

| | | | | |
|---|---|---|---|---|
| 2012/0009809 | A1* | 1/2012 | Kataoka | H01R 13/5208 |
| | | | | 439/271 |
| 2018/0358748 | A1* | 12/2018 | Yamanashi | H01R 24/62 |
| 2021/0036457 | A1* | 2/2021 | Aoki | H01R 13/748 |
| 2022/0029349 | A1* | 1/2022 | Kobayashi | H01R 13/4364 |

* cited by examiner

CONNECTOR HAVING SEAL MEMBER

CROSS-REFERENCE TO RELATED APPLICATIONS

This application is based on and claims priority from Japanese Patent Application No. 2021-009350, filed on Jan. 25, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2002-190348 includes a connector housing, a rubber plug (sealing portion) to be accommodated into a mounting hole of the connector housing, and a ground terminal (male terminal) having an extending end to be pierced into the sealing portion.

A connector disclosed in Japanese Patent Laid-open Publication No. 2005-019319 includes a device-side terminal (male terminal) having an extending portion, a housing for accommodating the male terminal, and a sealing member (sealing portion) for sealing a clearance between the male terminal and the inner periphery of the device-side housing.

SUMMARY

In Japanese Patent Laid-open Publication Nos. 2002-190348 and 2005-019319, if a surface pressure between the male terminal and the sealing portion can be enhanced, sealability can be more satisfactorily ensured, which is preferable.

Accordingly, the present disclosure aims to provide a connector capable of satisfactorily ensuring sealability.

The present disclosure is directed to a connector with a male terminal including a tab, a housing for supporting the male terminal, a sealing space provided around the tab in the housing, a sealing portion to be accommodated into the sealing space while contacting the tab, and a pressing portion for setting the sealing portion in a compressed state by being located in the sealing space.

According to the present disclosure, it is possible to provide a connector capable of satisfactorily ensuring sealability.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a male terminal including a tab, a housing for supporting the male terminal, a sealing space provided around the tab in the housing, a sealing portion to be accommodated into the sealing space while contacting the tab, and a pressing portion for setting the sealing portion in a compressed state by being located in the sealing space.

By locating the pressing portion in the sealing space and setting the sealing portion in the compressed state, a surface pressure between the tab and the sealing portion can be enhanced and sealability around the tab of the male terminal can be satisfactorily ensured.

(2) Preferably, the housing has an end surface for closing one end of the sealing space, and the pressing portion is arranged to sandwich the sealing portion between the end surface and the pressing portion.

According to the above configuration, the surface pressure between the tab and the sealing portion can be enhanced by a simple configuration.

(3) The housing may include a cavity for accommodating a female terminal, and the tab may project into the cavity to be connectable to the female terminal.

According to the above configuration, the female terminal and the male terminal are connected in the common housing. Thus, it is not necessary to separately provide a male housing for accommodating the male terminal and a female housing for accommodating the female terminal.

(4) A retainer for restricting escape of the female terminal from the cavity may be mounted into the housing, and the sealing portion may include a tab sealing hole and a retainer sealing hole, the tab being passed through the tab sealing hole, the retainer being passed through the retainer sealing hole.

According to the above configuration, since the tab sealing hole for sealing the male terminal and the retainer sealing hole for sealing the retainer are provided in the common sealing portion, it is not necessary to provide sealing portions respectively corresponding to the tab of the male terminal and the retainer.

Details of Embodiment of Present Disclosure

A specific example of the present disclosure is described below with reference to the drawings. Note that the present invention is not limited to this illustration and is intended to be represented by claims and include all changes in the scope of claims and in the meaning and scope of equivalents.

Embodiment

Figure 1:
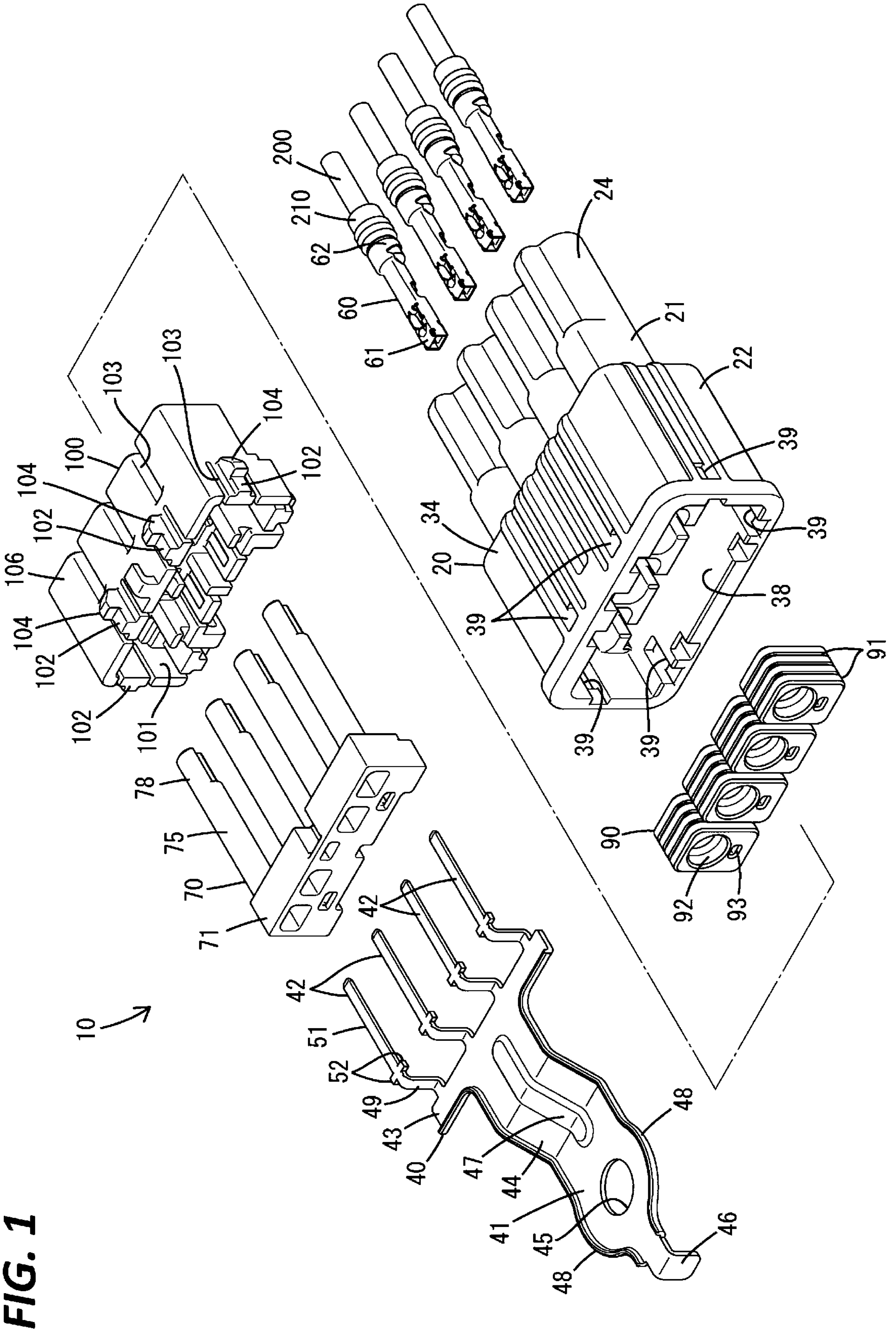
FIG. 1 is an exploded perspective view of a connector according to one embodiment.
Figure 2:
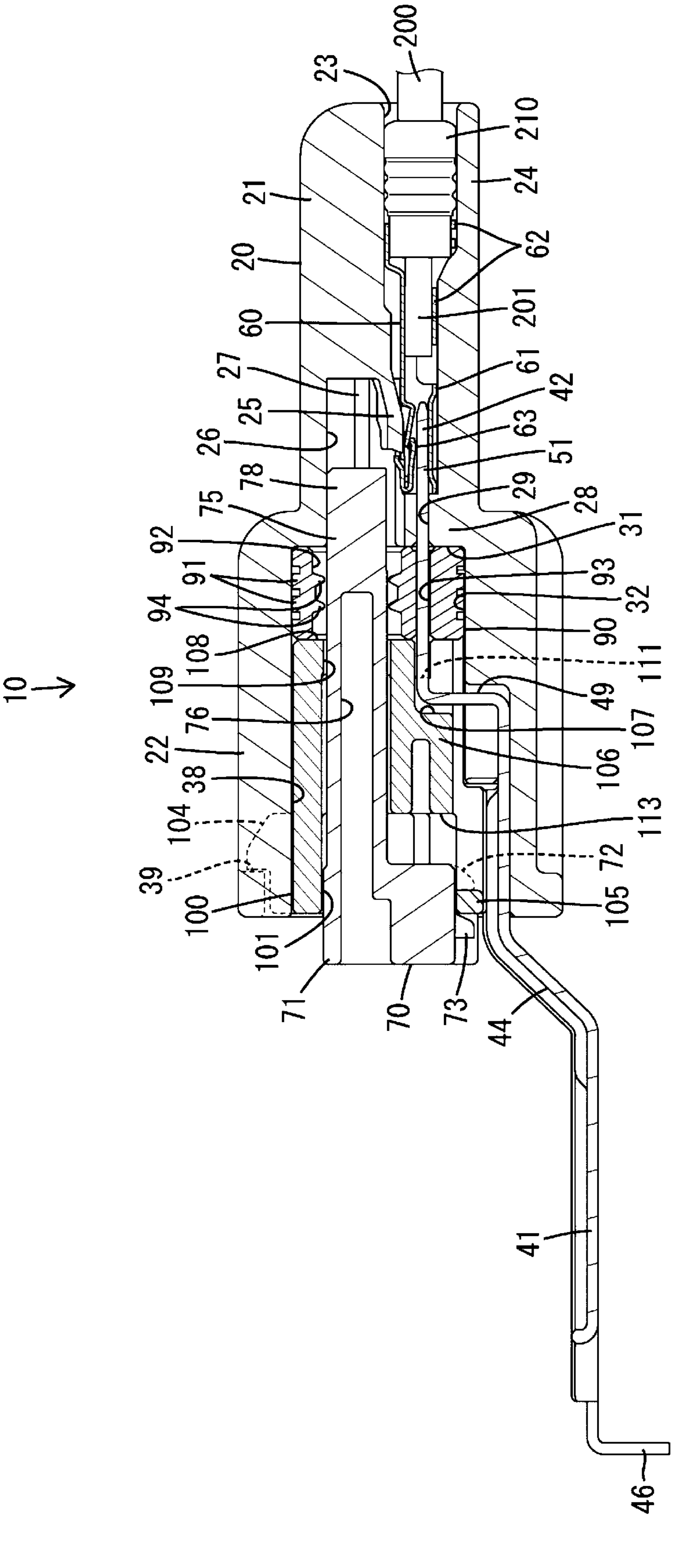
FIG. 2 is a side view in section of the connector in a state where a retainer is at a partial locking position.
Figure 3:
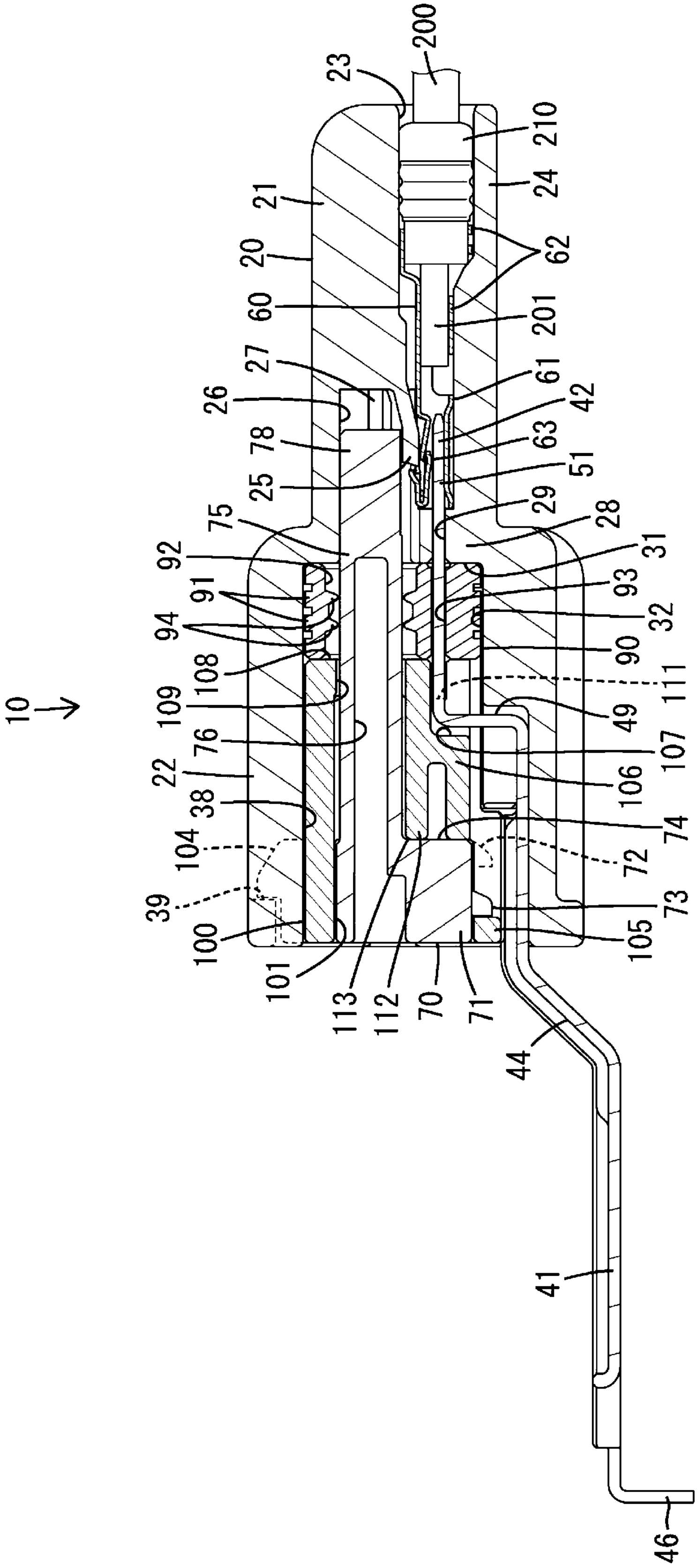
FIG. 3 is a side view in section of the connector in a state where the retainer is at a full locking position.

A connector 10 according to one embodiment includes, as shown in FIG. 1, a housing 20, a male terminal 40, female terminals 60, a retainer 70, sealing portions 90 and a pressing portion 100. As shown in FIGS. 2 and 3, the male terminal 40 and the female terminals 60 are connected to each other in the housing 20. The retainer 70 is mounted into the housing 20. The sealing portions 90 are held in close contact with later-described tabs 42 of the male terminal 40. The pressing portion 100 sets the sealing portions 90 in a compressed state between the housing 20 and the pressing portion 100.

Note that, in the following description, a right side of FIGS. 2 and 3 is referred to as a front side concerning a front-rear direction. A vertical direction is synonymous with a height direction and based on a vertical direction of each figure. A lateral direction is synonymous with a width direction and based on a lateral direction of FIGS. 4, 5, 7 and 8. Note that these direction references do not necessarily coincide with directions in an actually used state.

(Housing 20)

The housing 20 is made of synthetic resin and includes, as shown in FIGS. 1 to 3, an accommodating portion 21 in a front part and a fitting portion 22 in a rear part. The accommodating portion 21 has a flat shape extending in the lateral direction and includes a plurality of cavities 23 arranged in a row in the lateral direction. Each cavity 23 is provided to extend in the front-rear direction in a hollow cylindrical portion 24.

Figure 5:
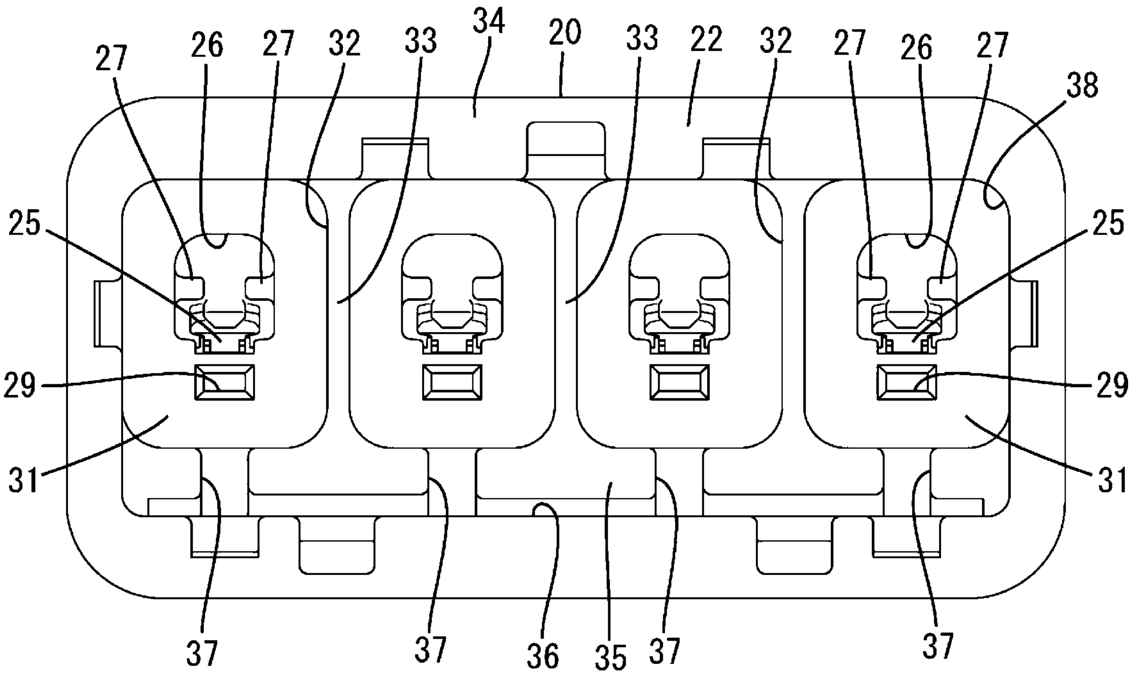
FIG. 5 is a back view of a housing.

The accommodating portion 21 includes locking lances 25 projecting into the respective cavities 23. As shown in FIGS. 2 and 3, the locking lance 25 is cantilevered rearward from the upper surface of the inner wall of the cavity 23 and is deflectable and deformable in the vertical direction. The housing 20 includes deflection spaces 26 for allowing the deflection of the locking lances 25 above the locking lances 25. As shown in FIG. 5, the deflection space 26 has a part narrowed by a pair of protruding portions 27 protruding to face each other from both left and right side wall surfaces in the accommodating portion 21 shown in FIG. 1.

The fitting portion 22 is the form of a rectangular tube one size larger than the accommodating portion 21 and open rearward. Each cavity 23 is provided from the accommodating portion 21 to a front part of the fitting portion 22 shown in FIG. 1. As shown in FIGS. 2 and 3, the rear end of the cavity 23 is closed by a wall portion 28. Tab insertion holes 29 are provided to penetrate through the wall portion 28 in the front-rear direction. The later-described tabs 42 of the male terminal 40 are arranged to project into the cavities 23 through the tab insertion holes 29. The rear surface of the wall portion 28 serves as an end surface 31 extending along the vertical direction and lateral direction. As shown in FIG. 5, the end surface 31 is exposed rearward through sealing spaces 32 to be described later.

As shown in FIG. 5, the fitting portion 22 includes a plurality of the sealing spaces 32 arranged in a row in the lateral direction behind the end surface 31. The respective sealing spaces 32 have a rectangular cross-sectional shape (opening shape) with four rounded corners, adjacent ones thereof are partitioned by partition walls 33, upper sides thereof are defined by an upper wall 34 of the fitting portion 22 and lower sides thereof are defined by a bottom wall 35.

As shown in FIG. 5, the bottom wall 35 includes a first mounting hole 36 continuously extending in the lateral direction and open rearward. Further, the bottom wall 35 includes a plurality of second mounting grooves 37 extending in the front-rear direction and open rearward for each sealing space 32. Each second mounting groove 37 is provided by cutting the rear end of the bottom wall 35 and communicates with the sealing space 32 and the first mounting groove 36. The male terminal 40 is mounted into the first mounting groove 36 and the respective second mounting grooves 37 as described later.

Further, the fitting portion 22 includes a pressing portion accommodation space 38 behind each sealing space 32. The pressing portion accommodation space 38 communicates with each sealing space 32. Each partition wall 33 and the bottom wall 35 are arranged in front of the pressing portion accommodation space 38.

As shown in FIG. 1, a pair of lock receiving portions 39 spaced apart in the lateral direction are provided in each of the upper wall 34 and a lower wall of the fitting portion 22. Further, a lock receiving portion 39 is provided in each of left and right side walls of the fitting portion 22. Each lock receiving portion 39 is in the form of a hole having a rectangular cross-section and penetrating in a thickness direction through the corresponding wall (upper wall 34, lower wall, side wall) of the fitting portion 22, and communicates with the pressing portion accommodation space 38 inside. As shown in FIGS. 2 and 3, a later-described locking protrusion 104 of the pressing portion 100 enters and is lockable to the lock receiving portion 39.

(Male Terminal 40)

The male terminal 40 is a busbar made of conductive metal and includes, as shown in FIG. 1, a mounting portion 41 in a rear part, a plurality of the tabs 42 in a front part and a coupling portion 43 between the mounting portion 41 and the respective tabs 42.

The mounting portion 41 includes an inclined portion 44 at an intermediate position in the front-rear direction. Out of regions of the mounting portion 41 on both front and rear sides across the inclined portion 44, the rear region is horizontally arranged at a position lower than the front region and includes a mounting hole 45 having a circular cross-section in a central part. Further, the male terminal 40 includes a hooking portion 46 bent downward from the rear end of the mounting portion 41. The male terminal 40 is mounted on an unillustrated mounting object (ground connection object) via a bolt or the like inserted through the mounting hole 45 with the hooking portion 46 hooked to an unillustrated hooked portion.

A bead portion 47 bulging upward is provided in a laterally central part of the mounting portion 41. Further, rib-like rising edge parts 48 are provided on both left and right end parts of the mounting portion 41. The bead portion 47 and the rising end parts 48 function to maintain the bent shape of the mounting portion 41.

The coupling portion 43 is in the form of a plate extending in the lateral direction and protruding toward both left and right sides of the mounting portion 41. The coupling portion 43 includes rising end parts 48 continuous from the side of the mounting portion 41 on the rear ends of parts protruding toward the both left and right sides.

The respective tabs 42 are in the form of plates having a rectangular cross-section, and arranged side by side in the lateral direction on the front end of the coupling portion 43. Specifically, the tab 49 includes a base end part 49 projecting upward from the front edge of the coupling portion 43 and a tip part 51 projecting forward from the upper end of the base end part 49. The tip part 51 includes a pair of projecting pieces 52 protruding toward both left and right sides at a position near the base end part 49.

(Female Terminals 60)

The female terminal 60 is made of conductive metal and includes, as shown in FIG. 1, a tubular connecting portion 61 and a barrel portion 62 in the form of an open barrel provided in front of the connecting portion 61.

As shown in FIGS. 2 and 3, the barrel portion 62 is crimped to a core 201 in an end part of a wire 200 and electrically connected to the wire 200. Further, the barrel portion 62 is crimped to a rubber plug 210 fit on the end part of the wire 200. The rubber plug 210 is inserted into a front part of the cavity 23 and held in close contact with the inner peripheral surface of the cavity 23. In this way, the inside of the cavity 23 of the housing 20 is maintained liquid tight.

(Retainer 70)

Figure 6:
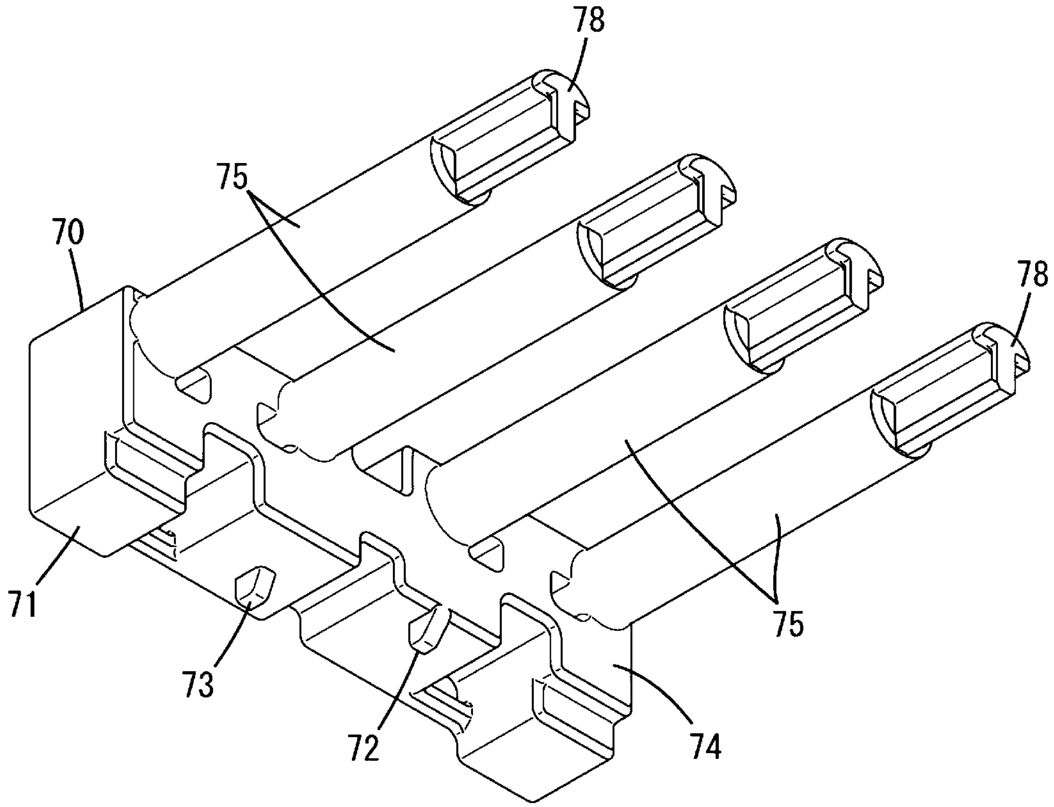
FIG. 6 is a perspective view of the retainer.

The retainer 70 is made of synthetic resin and includes, as shown in FIG. 6, a retainer body 71 extending in the lateral direction. The retainer body 71 includes a first projection 72 and a second projection 73 arranged while being spaced apart in the lateral direction on a lower surface. The first projection 72 is arranged forward of the second projection 73 on the lower surface of the retainer body 71. The retainer 70 is held movably between a partial locking position (see FIG. 2) and a full locking position (see FIG. 3) with respect to the pressing portion 100. The first and second projections 72, 73 are locked to later-described holding portions 105 of the pressing portion 100 when the retainer 70 is at the partial locking position and the full locking position. The retainer body 71 includes a front surface portion 74 extending along the vertical direction and lateral direction.

Figure 4:
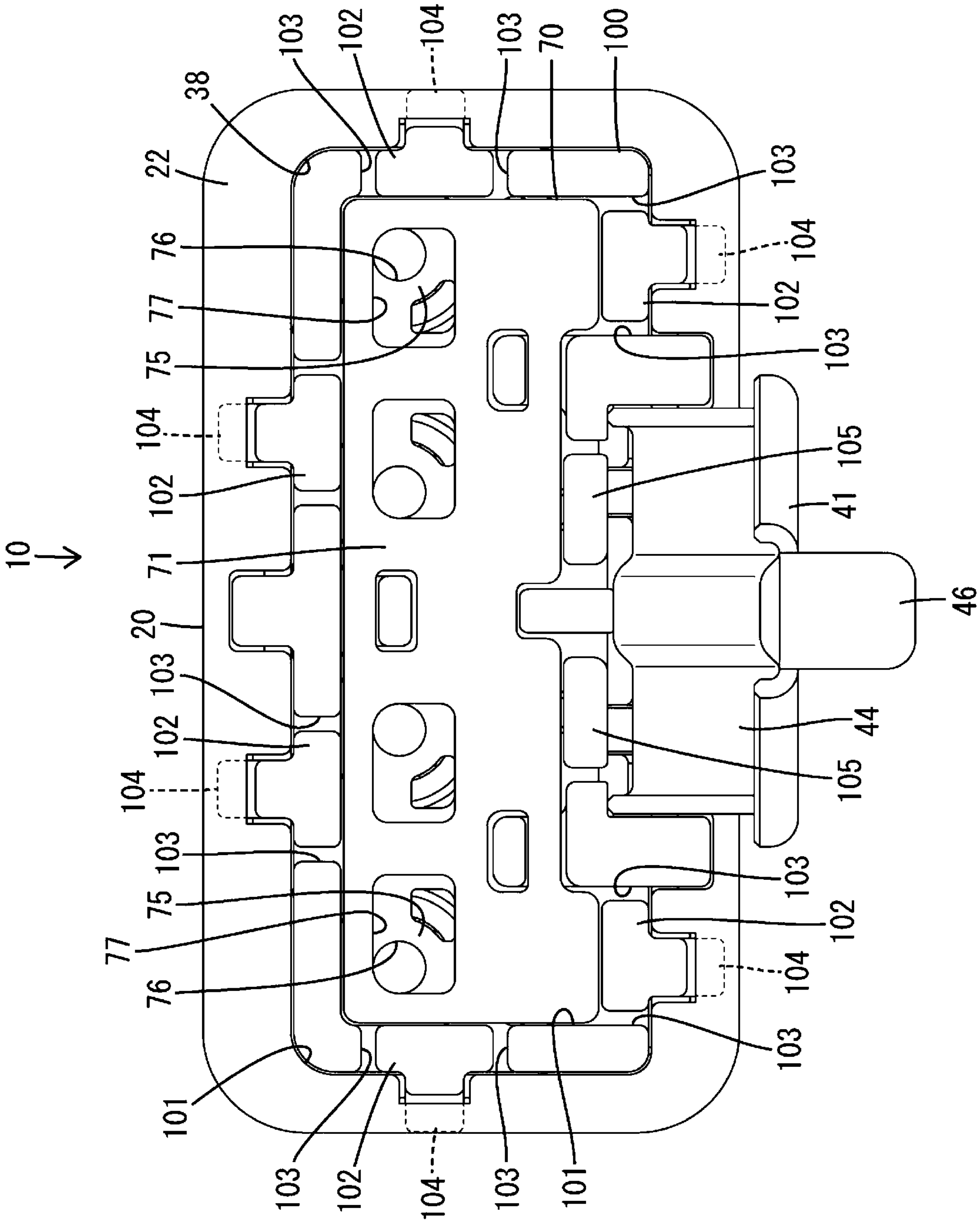
FIG. 4 is a back view of the connector in the state where the retainer is at the full locking position.

Further, the retainer 70 includes a plurality of elongated plug portions 75 projecting forward from the front surface portion 74. On the front surface of the retainer body 71, the respective plug portions 75 are arranged at positions corresponding to the respective sealing spaces 32 (respective cavities 23) while being spaced apart in the lateral direction. Each plug portion 75 includes a hollow internal space 76 in a part except a restricting portion 78 on a tip side to be described later as shown in FIGS. 2 and 3. As shown in FIG. 4, the internal space 76 is exposed rearward through an opening 77 open in the rear surface of the retainer body 71.

As shown in FIG. 6, the restricting portion 78 having a T-shaped cross-section is provided on the tip side of each plug portion 75. The restricting portion 78 can be positioned to and fit into the deflection space 26 (see FIG. 5) open to similarly have an approximately T-shaped cross-section.

(Sealing Portions 90)

Figure 7:
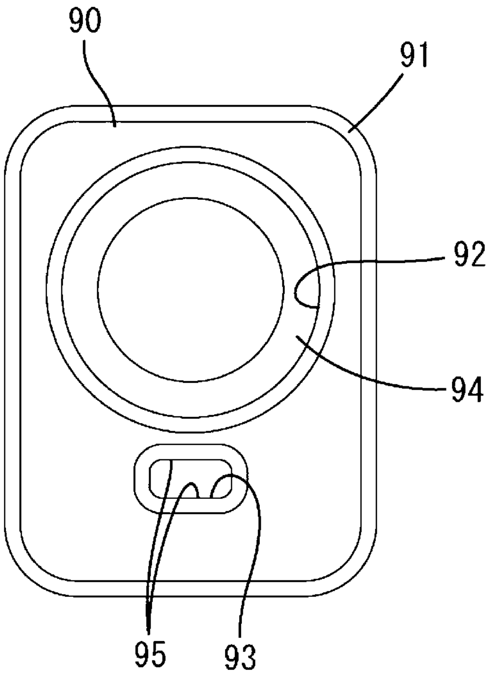
FIG. 7 is a front view of a sealing portion.

The sealing portion 90 is made of rubber such as silicon rubber and a plurality of the sealing portions 90 are provided to correspond to the respective sealing spaces 32 of the housing 20. In the case of this embodiment, a total of four sealing portions 90 are provided to individually correspond to the four sealing spaces 32. As shown in FIG. 7, the sealing portion 90 has a rectangular cross-sectional shape with four rounded corners. The front and rear surfaces of the sealing portion 90 are arranged along the vertical direction and lateral direction. A plurality of outer peripheral lips 91 are provided at intervals in the front-rear direction on the outer peripheral surface of the sealing portion 90. As shown in FIGS. 2 and 3, the sealing portion 90 is inserted into the sealing space 32. The respective outer peripheral lips 91 are held in close contact with the inner peripheral surface of the sealing space 32.

The sealing portion 90 includes a retainer sealing hole 92 penetrating in the front-rear direction and a tab sealing hole 93 similarly penetrating in the front-rear direction below the retainer sealing hole 92. The retainer sealing hole 92 is open in the sealing portion 90 to have a circular cross-section. The tab sealing hole 93 is open in the sealing portion 90 to have an oval shape (slit shape) long in the lateral direction. A plurality of inner peripheral lips 94 are provided at intervals in the front-rear direction on the inner peripheral surface of the retainer sealing hole 92. The plug portion 75 of the retainer 70 is inserted into the retainer sealing hole 92 of the sealing portion 90. The respective inner peripheral lips 94 are held in close contact with the outer peripheral surface of the plug portion 75. In this way, clearances between the retainer 70 and the housing 20 are maintained liquid tight.

As shown in FIG. 7, the upper and lower surfaces of the inner periphery of the tab sealing hole 93 have straight parts 95 along the lateral direction. The Tab 42 is inserted into the tab sealing hole 93 of the sealing portion 90. The straight parts 95 of the tab sealing hole 93 are held closely in surface contact with upper and lower plate surfaces of the tip part 51 of the tab 42.

(Pressing Portion 100)

The pressing portion 100 is made of synthetic resin and, as shown in FIG. 1, in the form of a cap open rearward as a whole. As shown in FIGS. 2 and 3, the pressing portion 100 includes a retainer accommodation space 101 in a rear part. The retainer body 71 is inserted into the retainer accommodation space 101. As shown in FIG. 4, a pair of locking portions 102 spaced apart in the lateral direction are provided on each of upper and lower walls defining upper and lower sides of the retainer accommodation space 101 in a rear part of the pressing portion 100. Further, locking portions 102 are also provided on side walls defining left and right sides of the retainer accommodation space 101 in the rear part of the pressing portion 100. The locking portion 102 is resiliently deformably provided between slits 103 open and paired in the lateral direction in the corresponding wall (upper wall, lower wall, side wall) of the rear part of the pressing portion 100. The locking portion 102 includes the claw-like locking protrusion 104 projecting outward.

Figure 8:
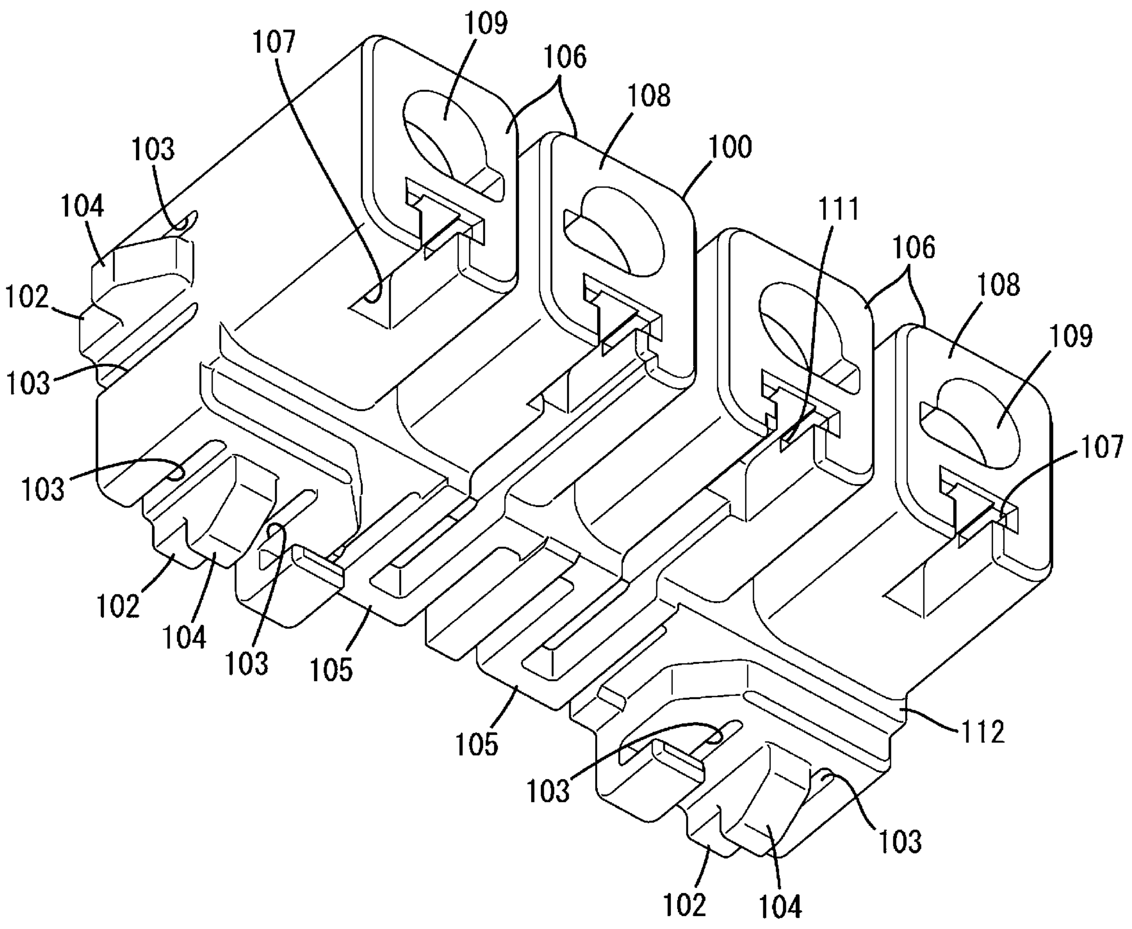
FIG. 8 is a perspective view of a pressing portion.

As shown in FIG. 8, the pressing portion 100 includes the holding portions 105 paired in the lateral direction at positions closer to a lateral center than the respective locking portions 102 on the lower wall. The holding portion 105 has a rectangular frame shape and is provided to be resiliently deformable with a front end side of the lower wall as a fulcrum.

The pressing portion 100 includes an intermediate wall 112 at an intermediate position in the front-rear direction. As shown in FIG. 3, the rear surface of the intermediate wall 112 has a stopper surface 113 defining the retainer accommodation space 101. When the retainer 70 reaches the full locking position, the front surface portion 74 of the retainer body 71 contacts the stopper surface 113 of the intermediate wall 112, thereby restricting any further pushing of the retainer 70.

As shown in FIG. 8, the pressing portion 100 includes a plurality of pressing body portions 106 laterally arranged in a row in a front part. Each pressing body portion 106 projects forward from the intermediate wall 112 and is shaped to be fittable into the sealing space 32. The pressing portion 100 includes third mounting grooves 107 formed by cutting lower end parts of the pressing body portions 106. The third mounting grooves 107 extend in the front-rear direction and are open in the front surfaces (pressing surfaces 108 to be described later) of the pressing body portions 106. The male terminal 40 is mounted into the third mounting grooves 107 as described later. Further, the pressing portion 100 includes plug portion insertion holes 109 penetrating through the respective pressing body portions 106 in the front-rear direction.

The front surface of each pressing body portion 106 serves as the pressing surface 108 extending along the vertical direction and lateral direction. The pressing surface 108 is configured by a front surface region of the pressing body portion 106 except opening parts of the third mounting groove 107 and the plug portion insertion hole 109.

(Overall Structure and Functions of Connector 10)

The sealing portion 90 is inserted into the sealing space 32 of the housing 20 from behind. The outer peripheral lips 91 of the sealing portion 90 are held in close contact with the inner peripheral surface of the sealing space 32. The front surface of the sealing portion 90 is contactably facing the end surface 31 of the housing 20.

The tip part 51 of the tab 42 of the male terminal 40 is passed through from the tab sealing hole 93 of the sealing portion 90 to the tab insertion hole 29 of the housing 20. A front end side of the tip part 51 of the tab 42 is arranged to project into the cavity 23 from the wall portion 28 (see FIGS. 2 and 3).

The coupling portion 43 of the male terminal 40 is inserted into the first mounting groove 36 and the base end parts 49 of the tabs 42 of the male terminal 40 are inserted into the second mounting grooves 37 to be locked. In this way, the male terminal 40 is supported in a state positioned with respect to the housing 20. With the male terminal 40 supported in the housing 20, the inclined portion 44, the rear region of the mounting portion 41 and the hooking portion are arranged to be exposed behind the housing 20 (see FIGS. 2 and 3).

The pressing portion 100 is inserted into the pressing portion accommodation space 38 of the housing 20 from behind. In the process of inserting the pressing portion 100, the locking protrusions 104 of the pressing portion 100 contact the rear end of the fitting portion 22 and the respective locking portions 102 are deflected and deformed inward. When the pressing portion 100 is properly inserted into the pressing portion accommodation space 38, the respective locking portions 102 resiliently return and the locking protrusions 104 are fit into the lock receiving portions 39. In this way, the pressing portion 100 is retained and held in the housing 20 (see FIGS. 2 and 3).

The retainer 70 is inserted into the retainer accommodation space 101 of the pressing portion 100 from behind. The restricting portions 78 of the plug portions 75 are passed through the retainer sealing holes 92 of the sealing portions 90 from the plug portion insertion holes 109 of the pressing portion 100 and are arranged to face the deflection spaces 26 from behind. The first projection 72 is inserted into the holding portion 105 and the second projection 73 is arranged outside the holding portion 105 (see FIG. 2). Rear end parts of the holding portions 105 are sandwiched between the first and second projections 72 and 73. In this way, the retainer 70 is held at the partial locking position with respect to the pressing portion 100. When the retainer 70 is inserted into the retainer accommodation space 101, the outer surface of the retainer body 71 contactably faces the respective locking portions 102 from inside (see FIG. 4). As a result, the deflection of the respective locking portions 102 is restricted and the holding portions 105 are reliably held in the housing 20.

When the pressing portion 100 is properly inserted into the pressing portion accommodation space 38, parts of the male terminal 40 from the base end parts 49 to the tip parts 51 are inserted into the third mounting grooves 107 (see FIGS. 2 and 3). The respective projecting pieces 52 of the male terminal 40 are arranged to be lockable to step surfaces 111 (see FIG. 8) of the third mounting grooves 107 from front. In this way, the male terminal 40 is restricted from coming out rearward from the housing 20 and positioned and held between the housing 20 and the pressing portion 100.

Further, when the pressing portion 100 is properly inserted into the pressing portion accommodation space 38, the respective pressing body portions 106 enter the respective sealing spaces 32 from behind. At this time, the pressing surfaces 108 of the respective pressing body portions 106 contact the rear surfaces of the respective sealing portions 90 and press the respective sealing portions 90 forward. Thus, the sealing portions 90 are disposed in a state compressed in the front-rear direction between the pressing surfaces 108 of the pressing portion 100 and the end surface 31 of the housing 20. A compression force is applied to the sealing portion 90 in a direction to enhance the adhesion of an interface between the tip part 51 of the tab 42 and the sealing portion 90 in the tab sealing hole 93. In this way, a satisfactory surface pressure (sealing surface pressure) is ensured between the tip part 51 of the tab 42 and the sealing portion 90.

Thereafter, the female terminal 60 connected to the end part of the wire 200 is inserted into the cavity 23 of the housing 20 from front. In the process of inserting the female terminal 60, the locking lance 25 contacts the connecting portion 61 to be deflected and deformed into the deflection space 26. When the female terminal 60 is properly inserted into the cavity 23, the locking lance 25 resiliently returns to lock the connecting portion 61 and the female terminal 60 is primarily retained in the cavity 23 by the locking lance 25. Further, when the female terminal 60 is properly inserted into the cavity 23, the connecting portion 61 contacts the front surface of the wall portion 28 to restrict any further rearward movement of the female terminal 60. The rubber plug 210 is inserted in a liquid-tight manner in a rear part of the cavity 23.

Further, in the process of inserting the female terminal 60, the tip part 51 of the tab 42 is inserted into the connecting portion 61 from front. When the female terminal 60 is properly inserted into the cavity 23, the front end side of the tip part 51 of the tab 42 contacts the resilient contact piece 63 provided in the connecting portion 61 and the both terminals 40, 60 are electrically connected.

After the female terminals 60 are properly inserted into the cavities 23, the retainer 70 is pushed forward to move from the partial locking position to the full locking position. When the retainer 70 reaches the full locking position, the restricting portions 78 of the plug portions 75 enter the deflection spaces 26 and contactably face the locking lances 25 from above (see FIG. 3). In this way, the deflection of the locking lances 25 is restricted, with the result that the female terminals 60 are secondarily retained in the cavities 23.

When the retainer 70 is at the full locking position, the first and second projections 72, 73 are both inserted into the holding portions 105 to restrict a movement of the retainer 70 in the front-rear direction. In contrast, if the female terminal 60 is left incompletely inserted without being properly inserted into the cavity 23, the restricting portion 78 of the plug portion 75 interferes with the locking lance 25 in a deflected state and the pushing of the retainer 70 to the full locking position is restricted. In this way, it can be detected that the female terminal 60 is left incompletely inserted in the cavity 23.

As described above, according to this embodiment, each pressing body portion 106 of the pressing portion 100 enters the corresponding sealing space 32 and the sealing portion 90 is disposed in the compressed state. Thus, the surface pressure between the tip part 51 of the tab 42 and the sealing portion 90 can be enhanced and sealability around the tab 42 of the male terminal 40 can be satisfactorily ensured.

Particularly, since the sealing portion 90 is sandwiched between the pressing surface 108 of the pressing body portion 106 and the end surface 31 of the housing 20, the surface pressure between the tip part 51 of the tab 42 and the sealing portion 90 can be enhanced by a simple configuration.

Further, since the housing 20 includes the cavities 23 for accommodating the female terminals 60 and the tabs 42 project into the cavities 23, the female terminals 60 and the male terminal 40 are connected in the common housing 20 and the number of components can be reduced accordingly.

Furthermore, since the tab sealing hole 93 and the retainer sealing hole 92 are provided in the common sealing portion 90, the number of components can be reduced as compared to the case where sealing portions 90 respectively corresponding to the tab 42 of the male terminal 40 and the retainer 70 are provided.

Moreover, since the plate surfaces of the tab 42 are held in close contact with the straight parts 95 of the sealing portion 90 parallel to these plate surfaces, a satisfactory compression force can be applied to the plate surfaces of the tab 42 from the sealing portion 90.

Other Embodiments of Present Disclosure

The embodiment disclosed this time should be considered illustrative in all aspects, rather than restrictive.

Although the pressing portion has a function of retaining the male terminal in the case of the above embodiment, a pressing portion may not have a function of retaining a male terminal and may not have a part configured to contact the male terminal according to another embodiment.

Although the pressing portion is configured to sandwich the sealing portions between the end surface of the housing and the pressing portion in the case of the above embodiment, a pressing portion only has to be configured to enter a sealing space and apply a compression force to a sealing portion according to another embodiment. For example, the pressing portion may be configured to enter the sealing space by moving in a direction facing plate surfaces of a tab (upward or downward direction in the case of the above embodiment).

Although the female terminals and the male terminal are connected in the common housing in the case of the above embodiment, a female housing for accommodating a female terminal and a male housing for accommodating a male terminal may be separately provided and the female and male terminals may be electrically connected by connecting the female and male housings to each other according to another embodiment.

Although the plug portions are provided on the retainer having a retainer function of restricting the deflection of the locking lances in the case of the above embodiment, a plug portion may be provided on a member not having the retainer function according to another embodiment.

Although the male terminal is configured as a busbar including the plurality of tabs in the case of the above embodiment, a male terminal may be configured as a board terminal having a tab shape as a whole according to another embodiment.

Although the plurality of sealing portions are provided to correspond to the respective sealing spaces in the case of the above embodiment, sealing portions may be coupled and integrated with each other via a bridge portion according to another embodiment.

Although the retainer sealing hole and the tab sealing hole are provided in the common sealing portion in the case of the above embodiment, a retainer sealing hole and a tab sealing hole may be respectively provided in corresponding sealing portions (retainer sealing portion and tab sealing portion) according to another embodiment.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
- a male terminal including a tab;
- a housing including a cavity that accommodates a female terminal and configured to support the male terminal;
- a retainer mounted in the housing and configured to restrict escape of the female terminal from the cavity;
- a sealing space provided around the tab in the housing;
- a sealing portion to be accommodated into the sealing space while contacting the tab, and including a tab sealing hole through which the tab is passed and a retainer sealing hole through which the retainer is passed; and
- a pressing portion configured to set the sealing portion in a compressed state by being located in the sealing space,
- wherein a front surface of the sealing portion faces an end surface of the housing that closes one end of the sealing space,
- the pressing portion is arranged to sandwich the sealing portion between the end surface and the pressing portion, and
- the tab projects into the cavity to be connectable to the female terminal.

* * * * *